United States Patent
Ly et al.

(10) Patent No.: US 10,862,663 B2
(45) Date of Patent: Dec. 8, 2020

(54) DEVICES AND METHODS FOR FACILITATING SCALABLE SYNCHRONIZATION CHANNELS

(71) Applicant: QUALCOMM Incorporated, San Diego, CA (US)

(72) Inventors: Hung Ly, San Diego, CA (US); Hao Xu, San Diego, CA (US); Wanshi Chen, San Diego, CA (US); Tingfang Ji, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 119 days.

(21) Appl. No.: 15/480,189

(22) Filed: Apr. 5, 2017

(65) Prior Publication Data

US 2018/0091287 A1 Mar. 29, 2018

Related U.S. Application Data

(60) Provisional application No. 62/401,779, filed on Sep. 29, 2016.

(51) Int. Cl.
H04L 7/00 (2006.01)
H04L 5/00 (2006.01)
(Continued)

(52) U.S. Cl.
CPC ........... *H04L 7/0066* (2013.01); *H04L 5/005* (2013.01); *H04L 5/0053* (2013.01);
(Continued)

(58) Field of Classification Search
CPC ..... H04L 7/0066; H04L 5/005; H04L 5/0053; H04L 5/0094; H04L 5/0076;
(Continued)

(56) References Cited

U.S. PATENT DOCUMENTS

2017/0359791 A1* 12/2017 Onggosanusi ...... H04L 27/2613
2018/0049113 A1* 2/2018 Jung ..................... H04L 5/0048

OTHER PUBLICATIONS

Nokia et al., "On System Design for Multiple Numerologies—Initial Access", 3GPP Draft; R1-167258, 3rd Generation Partnership Project (3GPP), Mobile Competence Centre ; 650, Route Des Lucioles; F-06921 Sophia-Antipolis Cedex; France, vol. RAN WG1, No. Gothenburg, Sweden; Aug. 21, 2016, XP051125795. (Year: 2016).*

(Continued)

*Primary Examiner* — Michelle M Koeth
(74) *Attorney, Agent, or Firm* — Loza & Loza LLP

(57) ABSTRACT

Wireless communication devices are adapted to facilitate scalable synchronization channels in a wireless communications system. According to one example, a wireless communication device may identify a reference synchronization channel including a reference bandwidth and a reference numerology, where the reference numerology includes a reference subcarrier spacing and a reference cyclic prefix. The reference synchronization channel may be scaled according to a type of communication, resulting in a scaled synchronization channel including a scaled bandwidth and a scaled numerology compatible with the communication type. According to another example, a wireless communication device may determine a communication type employed by the device for wireless communications, and may search for a particular scaled synchronization channel based on the determined communication type. Other aspects, embodiments, and features are also included.

30 Claims, 10 Drawing Sheets

(51) Int. Cl.
*H04L 27/26* (2006.01)
*H04W 4/70* (2018.01)

(52) U.S. Cl.
CPC ........ *H04L 5/0094* (2013.01); *H04L 27/2613* (2013.01); *H04L 27/2666* (2013.01); *H04L 27/2692* (2013.01); *H04W 4/70* (2018.02); *H04L 5/0076* (2013.01)

(58) Field of Classification Search
CPC ............. H04L 27/2613; H04L 27/2666; H04L 27/2692; H04W 4/70
See application file for complete search history.

(56) References Cited

OTHER PUBLICATIONS

Qualcomm Incorporated: "Numerology Requirements", 3GPP Draft; R1-163397, 3rd Generation Partnership Project (3GPP), Mobile Competence Centre; 650, Route Des Lucioles; F-06921 Sophia-Antipolis Cedex; France, vol. RAN WG1, No. Susan, Korea; Apr. 18, 2016, XP051097177. (Year: 2016).*

"EUTRA/LTE Digital Standard for R&S® Signal Generators Operating Manual EUTRA/LTE, LTE Rel. 9, LTE closed loop BS Test, LTE Logfile Generation, LTE-A Rel. 10," Rohde & Schwarz, 2013. (Year: 2013).*

Huawei et al., "A Common Synchronization Signal for a NR Carrier Supporting Different Numerologies", 3GPP Draft; R1-167217, 3rd Generation Partnership Project (3GPP), Mobile Competence Centre; 650, Routedes Lucioles ; F-06921 Sophia-Antipolis Cedex ; France, vol. RAN WG1, No. Gothenburg, Sweden; Aug. 21, 2016, XP051140585, Retrieved from the Internet: URL:http://www.3gpp.org/ftp/Meetings_3GPP_SYNC/RAN1/Docs/ [retrieved on Aug. 21, 2016], 7 pages.

International Search Report and Written Opinion—PCT/US2017/048161—ISA/EPO—dated Oct. 13, 2017.

Nokia et al., "On System Design for Multiple Numerologies—Initial Access", 3GPP Draft; R1-167258, 3rd Generation Partnership Project (3GPP), Mobile Competence Centre ; 650, Route Des Lucioles; F-06921 Sophia-Antipolis Cedex; France, vol. RAN WG1, No. Gothenburg, Sweden; Aug. 21, 2016, XP051125795, Retrieved from the Internet: URL:http://www.3gpp.org/ftp/Meetings_3GPP_SYNC/RAN1/Docs/, [retrieved on Aug. 21, 2016], 6 pages.

Qualcomm Incorporated: "Numerology Requirements", 3GPP Draft; R1-163397, 3rd Generation Partnership Project (3GPP), Mobile Competence Centre; 650, Route Des Lucioles; F-06921 Sophia-Antipolis Cedex; France, vol. RAN WG1, No. Susan, Korea; Apr. 18, 2016, XP051097177, Retrieved from the Internet: URL:http://www.3gpp.org/ftp/tsg_ran/WG1_RL1/TSGR1_84b/Docs/, [retrieved on Apr. 18, 2016], 8 pages.

Zte et al., "Performance Evaluation of Numerology Candidates", 3GPP Draft; R1-164272, 3rd Generation Partnership Project (3GPP), Mobile Competence Centre; 650, Route Des Lucioles; F-06921 Sophia-Antipolis Cedex; France, vol. RAN WG1, No. Nanjing, China; May 14, 2016, XP051090020, Retrieved from the Internet: URL:http://www.3gpp.org/ftp/tsg_ran/WG1_RL1/TSGR1_85/Docs/, [retrieved on May 14, 2016], 7 pages.

* cited by examiner

DEVICES AND METHODS FOR FACILITATING SCALABLE SYNCHRONIZATION CHANNELS

PRIORITY CLAIM

The present application for patent claims priority to Provisional Application No. 62/401,779 entitled "System and Method that Facilitates a Scalable synchronization Channel" filed Sep. 29, 2016, and assigned to the assignee hereof and hereby expressly incorporated by reference herein.

TECHNICAL FIELD

The technology discussed herein relates generally to wireless communications, and more particularly, to methods and devices for facilitating scalable synchronization channels in a wireless communications system.

INTRODUCTION

As the demand for mobile broadband access continues to increase, research and development continue to advance wireless communication technologies not only to meet the growing demand for mobile broadband access, but to advance and enhance the user experience with mobile communications. For example, the third generation partnership project (3GPP) is an organization that develops and maintains telecommunication standards for fourth generation (4G) long-term evolution (LTE) networks. Recently, the 3GPP has begun the development of a next-generation evolution of LTE, which generally corresponds to a fifth generation (5G) new radio (NR) network. As it stands today, this 5G NR network may exhibit a higher degree of flexibility and scalability than LTE, and is envisioned to support very diverse sets of requirements. In particular, 5G NR is envisioned to support a diverse set of use cases and deployments including, for example, massive machine-type communication (mMTC), millimeter wave (mmWave) communication, enhanced mobile broadband (eMBB) communication, and ultra-reliable low latency communication (URLLC). To facilitate such communications, it is further envisioned that 5G NR will support a wide range of frequency bands (e.g., from 4 GHz to 60 GHz), as well as a flexible system bandwidth (e.g., up to 100 MHz in eMBB/URLLC, 200 kHz-5 MHz in mMTC, or 30 Ghz-300 Ghz in mmWave) and a flexible numerology (e.g., 15 kHz, 30 kHz, 60 kHz, 120 kHz, etc).

Since 5G NR is envisioned to support a diverse set of use cases and deployments, it is anticipated that different synchronization channels will be advantageous. Accordingly, a flexible synchronization channel design may be desirable so that an NR-enabled device may seamlessly toggle between these diverse use cases and deployments.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Since various types of wireless communication devices can be utilized in diverse use cases and deployments, it may be desirable to facilitate a flexible synchronization channel. Various examples and implementations of the present disclosure facilitate scalable synchronization channels. According to at least one aspect of the present disclosure, apparatus for wireless communication may include a transceiver, a memory, and a processing circuit coupled to the transceiver and the memory. The processing circuit may be adapted to identify a reference synchronization channel, where the reference synchronization channel includes a reference bandwidth and a reference numerology, and where the reference numerology includes a reference subcarrier spacing and a reference cyclic prefix. The processing circuit may further be adapted to scale the reference synchronization channel according to a type of communication, where the scaling results in a scaled synchronization channel including a scaled bandwidth and a scaled numerology, and where the scaled synchronization channel is compatible with the type of communication. The processing circuit may further transmit via the transceiver the scaled synchronization channel.

Further aspects provide methods operational on apparatus for wireless communication and/or apparatus for wireless communication including means to perform such methods. One or more examples of such methods may include identifying a reference synchronization channel, the reference synchronization channel including a reference bandwidth and a reference numerology, where the reference numerology includes a reference subcarrier spacing and a reference cyclic prefix. The reference synchronization channel may be scaled according to a type of communication, where the scaling results in a scaled synchronization channel including a scaled bandwidth and a scaled numerology, and where the scaled synchronization channel is compatible with the type of communication. The scaled synchronization channel may then be transmitted.

Still further aspects of the present disclosure include computer-readable storage mediums storing processor-executable programming. In at least one example, the processor-executable programming may be adapted to cause a processing circuit to identify a reference synchronization channel including a reference bandwidth and a reference numerology, where the reference numerology includes a reference subcarrier spacing and a reference cyclic prefix. The processor-executable programming may further be adapted to cause a processing circuit to scale the reference synchronization channel according to a type of communication, resulting in a scaled synchronization channel with a scaled bandwidth and a scaled numerology, where the scaled synchronization channel is compatible with the type of communication. The processor-executable programming may further be adapted to cause a processing circuit to transmit the scaled synchronization channel.

Additional aspects of the present disclosure include apparatus for wireless communication. According to one or more examples, such apparatus may include a transceiver, a memory, and a processing circuit coupled to the transceiver and the memory. The processing circuit may be adapted to determine a communication type employed for wireless communications, and search for a particular scaled synchronization channel based on the determined communication type employed. The scaled synchronization channel may be scaled from a reference synchronization channel and may include a scaled bandwidth and a scaled numerology, where the scaled numerology includes a scaled subcarrier spacing and a scaled cyclic prefix.

Yet additional aspects provide methods operational on apparatus for wireless communication and/or apparatus for wireless communication including means to perform such methods. One or more examples of such methods may include identifying a type of communication employed for wireless communications, and searching for a scaled synchronization channel based on the identified type of communication. The scaled synchronization channel may be scaled from a reference synchronization channel and may include a scaled bandwidth and a scaled numerology, where the scaled numerology includes a scaled subcarrier spacing and a scaled cyclic prefix.

Still further aspects of the present disclosure include computer-readable storage mediums storing processor-executable programming. In at least one example, the processor-executable programming may be adapted to determine a communication type employed for wireless communications, and search for a particular scaled synchronization channel based on the determined communication type employed. The scaled synchronization channel may be scaled from a reference synchronization channel and may include a scaled bandwidth and a scaled numerology, where the scaled numerology includes a scaled subcarrier spacing and a scaled cyclic prefix.

Other aspects, features, and embodiments associated with the present disclosure will become apparent to those of ordinary skill in the art upon reviewing the following description in conjunction with the accompanying figures.

DRAWINGS

DETAILED DESCRIPTION

The detailed description set forth hereafter in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known circuits, structures, techniques and components are shown in block diagram form to avoid obscuring the described concepts and features.

Figure 1:
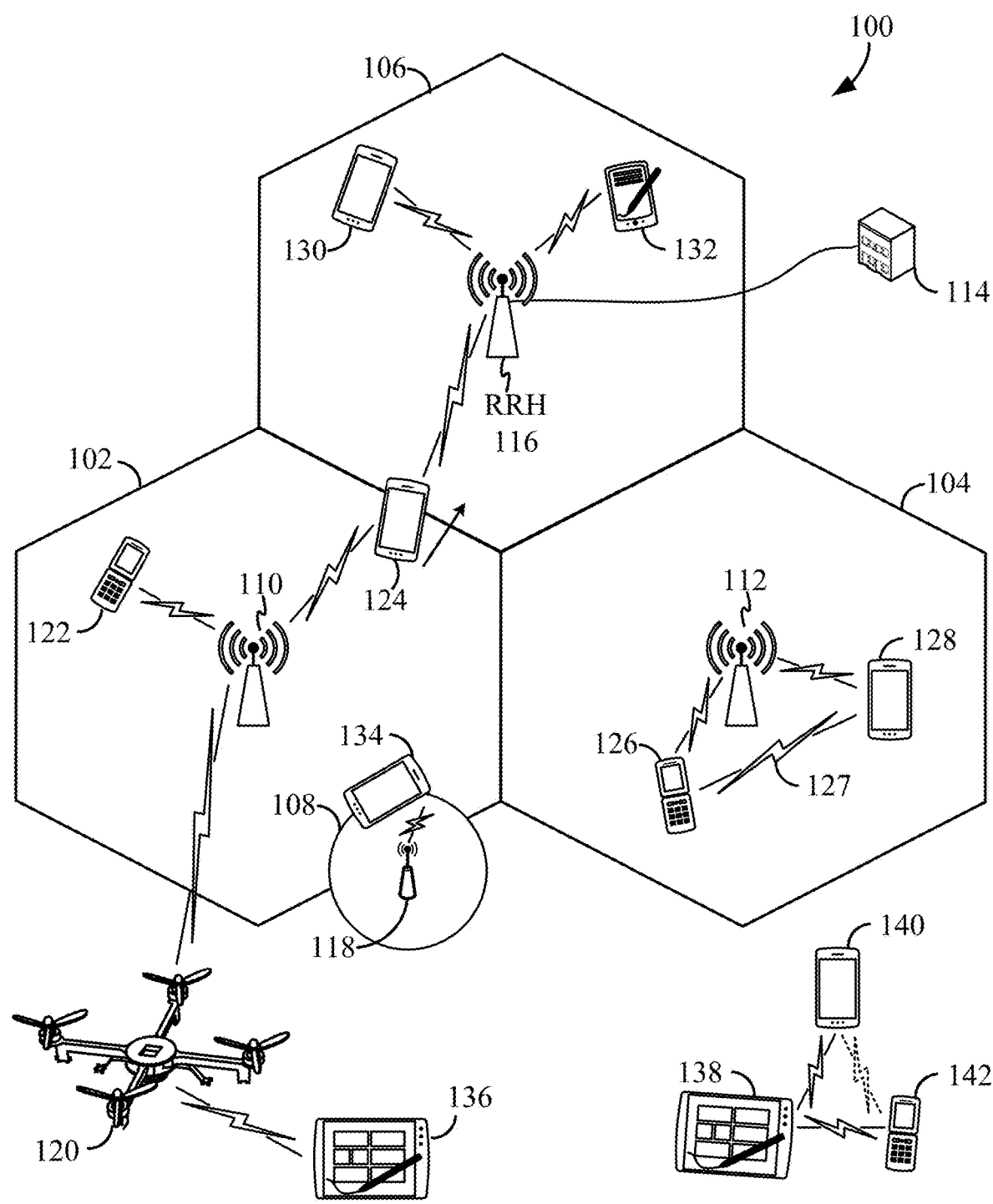
FIG. 1 is a conceptual diagram illustrating an example of an access network.

The various concepts presented throughout this disclosure may be implemented across a broad variety of telecommunication systems, network architectures, and communication standards. Referring now to FIG. 1, as an illustrative example without limitation, a block diagram of a network environment in which one or more aspects of the present disclosure may find application is provided. The access network 100 is adapted to facilitate wireless communication between two or more wireless communication devices.

The geographic region covered by the access network 100 may be divided into a number of cellular regions (cells), including macrocells 102, 104, and 106, and a small cell 108, each of which may include one or more sectors. Cells may be defined geographically (e.g., by coverage area) and/or may be defined in accordance with a frequency, scrambling code, etc. In a cell that is divided into sectors, the multiple sectors within a cell can be formed by groups of antennas with each antenna responsible for communication with mobile devices in a portion of the cell.

In general, a radio transceiver apparatus serves each cell. A radio transceiver apparatus is commonly referred to as a base station (BS) in many wireless communication systems, but may also be referred to by those skilled in the art as a base transceiver station (BTS), a radio base station, a radio transceiver, a transceiver function, a basic service set (BSS), an extended service set (ESS), an access point (AP), a Node B, an eNode B, a gNB, or some other suitable terminology.

In FIG. 1, two high-power base stations 110 and 112 are shown in cells 102 and 104; and a third high-power base station 114 is shown controlling a remote radio head (RRH) 116 in cell 106. In this example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In some examples, the base stations may be interconnected to one another and/or to one or more other base stations or network nodes (not shown) in the access network 100 through various types of backhaul interfaces such as a direct physical connection, a virtual network, or the like using any suitable transport network.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

Within the present document, a "mobile" apparatus need not necessarily have a capability to move, and may be stationary. Some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a consumer and/or wearable device, such as eyewear, a wearable camera, a smart watch, a health or fitness tracker, a digital audio player (e.g., MP3 player), a camera, a game console, etc. An IoT device may additionally be a digital home or smart home device such as a home audio, video, and/or multimedia device, an appliance, a sensor, a vending machine, intelligent lighting, a home security system, a smart meter, etc. A mobile apparatus may additionally be a smart energy or security device, a solar panel or solar array, municipal lighting, water, or other infrastructure; industrial automation and enterprise device, etc. Still further, a mobile apparatus may provide for telemedicine support, or health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the access network 100, the cells may include UEs that may be in communication with one or more sectors of each cell. For example, UEs 122 and 124 may be in communication with base station 110, UEs 126 and 128 may be in communication with base station 112, UEs 130 and 132 may be in communication with base station 114 by way of RRH 116, UE 134 may be in communication with low-power base station 118, and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or data from a base station (e.g., base station 110) to one or more UEs (e.g., UEs 122 and 124) may be referred to as downlink (DL) transmission, while transmissions of control information and/or data originating at a UE (e.g., UE 122) may be referred to as uplink (UL) transmissions. In addition, the uplink and/or downlink control information and/or traffic information may be time-divided into frames, subframes, slots, and/or symbols. As used herein, a symbol may refer to a unit of time that, in an OFDM waveform, carries one resource element (RE) per subcarrier. A slot may carry 7 or 14 OFDM symbols. A subframe may refer to a duration of 1 ms. Multiple subframes may be grouped together to form a single frame or radio frame. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
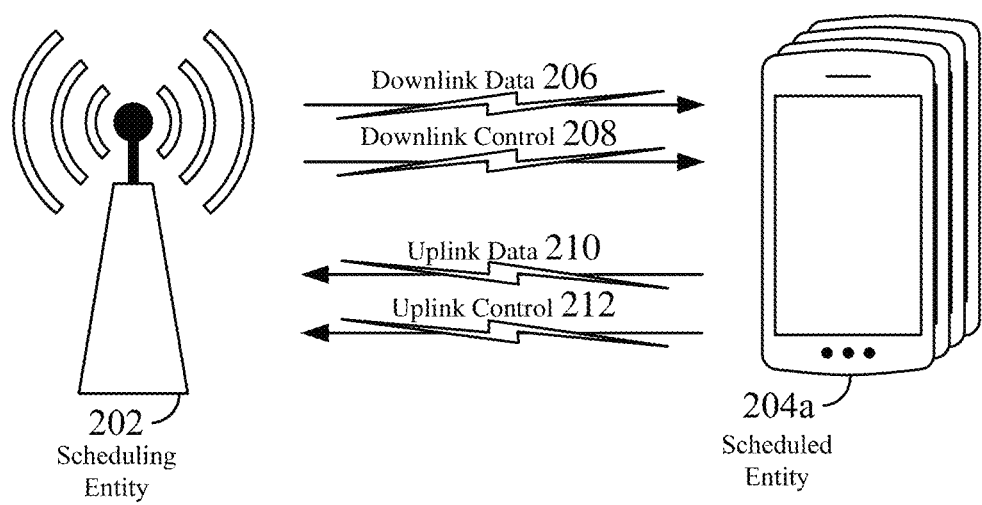
FIG. 2 is a block diagram conceptually illustrating an example of a scheduling entity communicating with one or more scheduled entities according to some embodiments.

Thus, in a wireless communication network with a scheduled access to time-frequency resources and having a cellular configuration, a P2P configuration, and a mesh configuration, a scheduling entity and one or more scheduled entities may communicate utilizing the scheduled resources. Referring now to FIG. 2, a block diagram illustrates a scheduling entity 202 and a plurality of scheduled entities 204. Here, the scheduling entity 202 may correspond to a base station 110, 112, 114, and/or 118. In additional examples, the scheduling entity 202 may correspond to a UE 138, the quadcopter 120, or any other suitable node in the access network 100. Similarly, in various examples, the scheduled entity 204 may correspond to the UE 122, 124, 126, 128, 130, 132, 134, 136, 138, 140, and 142, or any other suitable node in the access network 100.

As illustrated in FIG. 2, the scheduling entity 202 may broadcast data 206 and/or control information 208 to one or more scheduled entities 204. In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink data 210 from one or more scheduled entities to the scheduling entity 202. Another way to describe the system may be to use the term broadcast channel multiplexing. In accordance with aspects of the present disclosure, the term uplink may refer to a point-to-point transmission originating at a scheduled entity 204.

The scheduled entities 204 may transmit data 210 and/or control information 212 to a scheduling entity 202. Broadly, the scheduled entity 204 is a node or device that receives scheduling control information, including but not limited to scheduling grants, synchronization or timing information, or other control information from another entity in the wireless communication network such as the scheduling entity 202.

The channels or carriers illustrated in FIG. 2 are not necessarily all of the channels or carriers that may be utilized between a scheduling entity 202 and scheduled entities 204, and those of ordinary skill in the art will recognize that other channels or carriers may be utilized in addition to those illustrated, such as other data, control, and feedback channels.

In various aspects of the disclosure, an access network 100 may utilize DL-based mobility or UL-based mobility to enable mobility and handovers from one cell to another. In a network configured for DL-based mobility, during a call with a scheduling entity, or at any other time, a UE may monitor various parameters of the signal from its serving cell as well as various parameters of neighboring cells. Further, depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals may be utilized by the network to select a serving cell for a UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the access network 100. Each of the cells may measure a strength of the pilot signal, and the access network (e.g., one or more of the base stations 110 and 114/116 and/or a central node within the core network) may determine a serving cell for the UE 124. As the UE 124 moves through the access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

According to aspects of the present disclosure, wireless communication devices (scheduling entities and/or scheduled entities) may utilize a synchronization channel that facilitates flexibility in selecting one or more parameters according to a particular operating environment.

For example, one or more aspects of the present disclosure may facilitate a scalable synchronization channel design compatible with various use cases and deployments. For instance, a communication from a base station to a UE may include identification of a reference synchronization channel having a reference bandwidth and a reference numerology in which the reference numerology includes a reference subcarrier spacing and a reference cyclic prefix. Such a reference synchronization channel may be scaled based on a type of communication, such that the scaling results in a scaled synchronization channel having a scaled bandwidth and a scaled numerology, and such that the scaled synchronization channel is compatible with the particular type of communication.

In another example, one or more aspects of the present disclosure may facilitate communication from a UE to a base station where a scaled synchronization channel is searched according to a type of communication. The scaled synchronization channel may be scaled from a reference synchronization channel and may include a scaled bandwidth and a scaled numerology, where the scaled numerology can include a scaled subcarrier spacing and a scaled cyclic prefix.

According to one or more aspects of the present disclosure, a baseline synchronization channel may be utilized with a reference bandwidth (BW) and a reference numerology (e.g., sub-carrier spacing (SCS) and cyclic prefix (CP) duration). The reference numerology of the baseline synchronization channel can be scaled to obtain a new synchronization channel which is suitable for a target use case and deployment. Table 1 below provides an exemplary synchronization channel design in which aspects of a reference synchronization channel are scaled according to a target use case and deployment.

TABLE 1

| Sync channel | BW (MHz) | SCS (kHz) | CP (us) | Use case |
| --- | --- | --- | --- | --- |
| Baseline sync | 3.84 | 30 | 4.8 | eMBB/URLLC |
| Scaled sync-mMTC | 0.96 | 7.5 | 19.2 | mMTC |
| Scaled sync-mmW | 30.72 | 240 | 0.60 | mmW |

For this particular example, as shown in Table 1, a baseline synchronization channel including a reference bandwidth (BW), sub-carrier spacing (SCS), and cyclic prefix (CP) is defined to support enhanced mobile broadband (eMBB) communications and ultra-reliable low latency communications (URLLC). To achieve a synchronization channel suitable for massive machine-type communications (mMTC), the reference bandwidth (BW) and reference sub-carrier spacing (SCS) are scaled down, whereas the reference cyclic prefix (CP) is scaled up, as shown. However, to achieve a synchronization channel suitable for millimeter wave (mmWave) communications, the reference bandwidth (BW) and reference sub-carrier spacing (SCS) are scaled up, whereas the reference cyclic prefix (CP) is scaled down. Here, it should also be appreciated that the same scaled synchronization channel could be transmitted over multiple beams when utilizing beam sweeping for synchronization.

Figure 3:
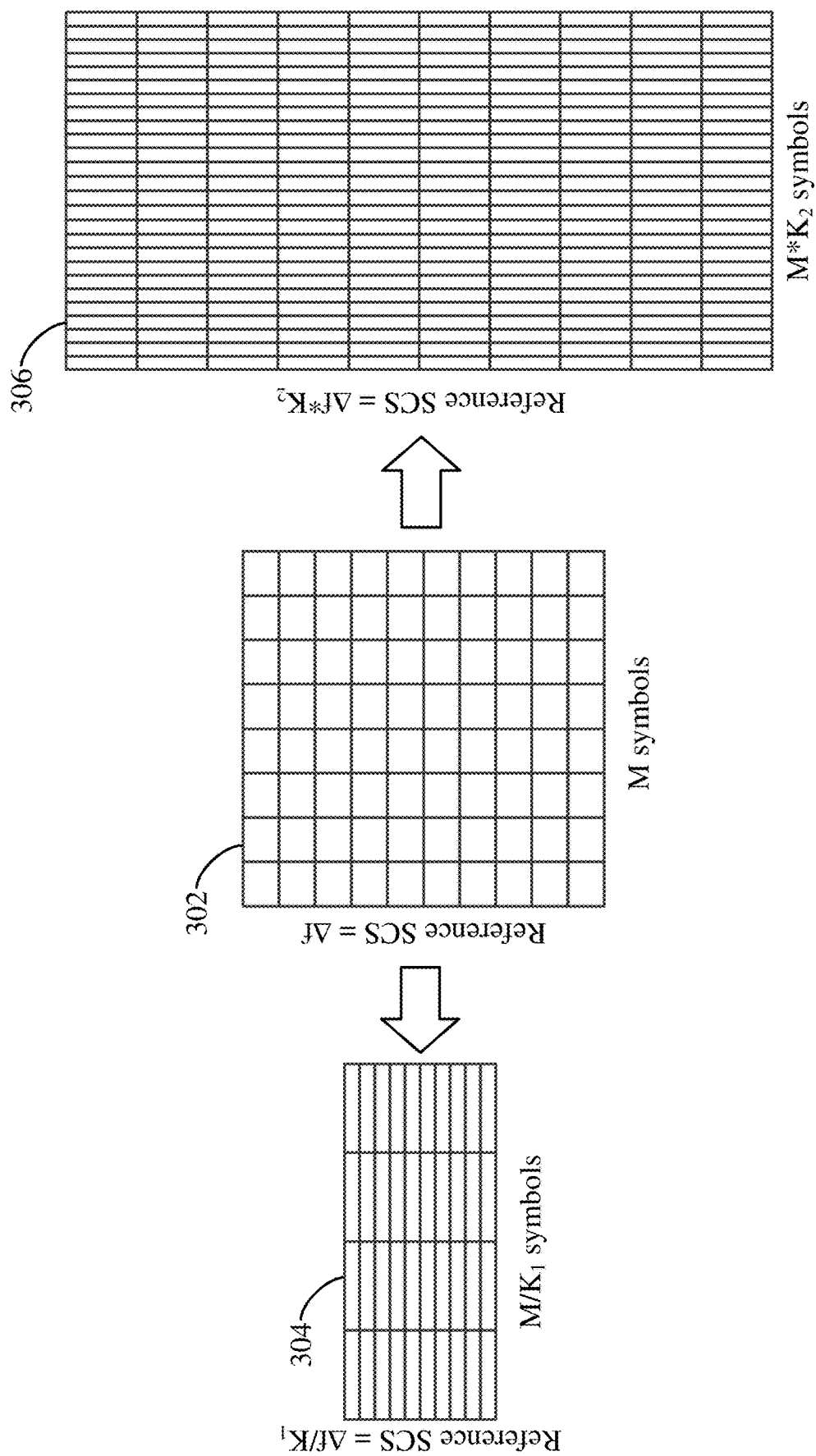
FIG. 3 is a block diagram illustrating an example of a scalable synchronization channel design according to one or more aspects of the disclosure.

Referring now to FIG. 3, a block diagram illustrating an example of a scalable synchronization channel design in accordance with one or more aspects of the disclosure is depicted. As illustrated, a baseline synchronization channel 302 having M symbols and an SCS of $\Delta f$ is depicted to support one or more communication types, such as eMBB and URLLC. To achieve a synchronization channel 304 suitable for one or more other communication types, such as mMTC, the baseline synchronization channel can be scaled by $K_1$, which results in $M/K_1$ symbols and an SCS of $\Delta f/K_1$, as shown. However, to achieve a synchronization channel 306 suitable for yet other communication types, such as mmWave communications, the baseline synchronization channel can be scaled by $K_2$, which results in $M*K_2$ symbols and an SCS of $\Delta f*K_2$, as shown.

Figure 4:
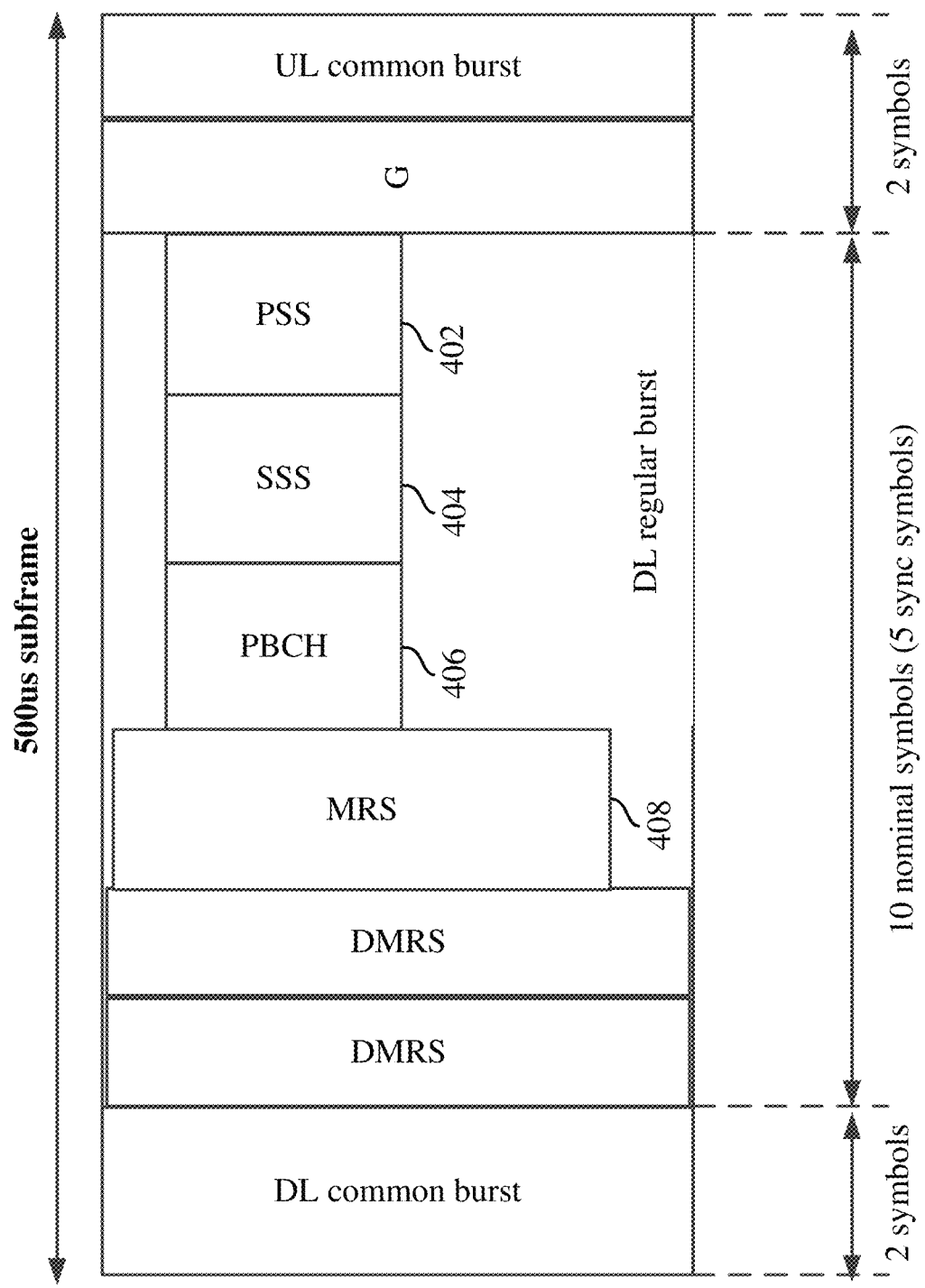
FIG. 4 is a block diagram illustrating an example of a slot for a baseline synchronization channel according to one or more implementations.

Turning now to FIG. 4, a block diagram is shown illustrating an example of a slot for a baseline synchronization channel, such as the baseline synchronization channel 302 in FIG. 3, according to one or more implementations. As illustrated, each of a primary synchronization signal (PSS) 402, a secondary synchronization signal (SSS) 404, and a physical broadcast channel (PBCH) 406 may be transmitted over a common synchronization bandwidth. In the depicted example, a measurement reference signal (MRS) 408 may be transmitted according to a particular reference numerology in a bandwidth wider than a scaled synchronization bandwidth. One or more other implementations may include transmitting the MRS 408 and PBCH 406 over the same antenna ports (e.g., where MRS 408 may be used as a phase reference for PBCH 406 demodulation), and multiplexing the MRS 408 and PBCH 406 in time or frequency.

Figure 5:
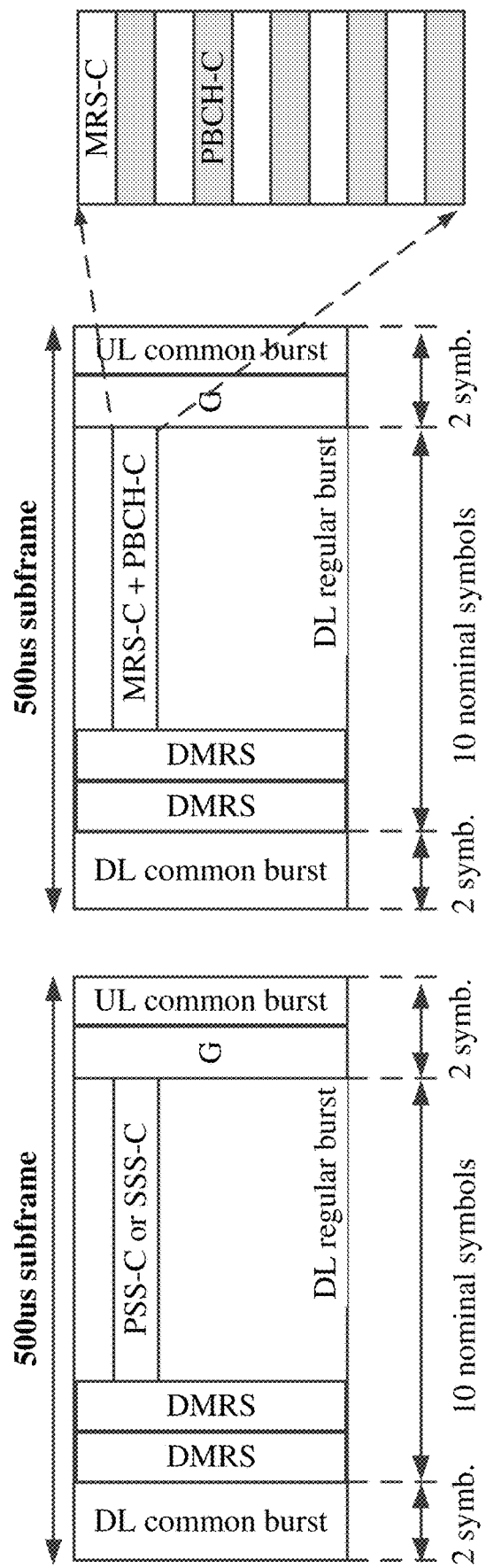
FIG. 5 is a block diagram illustrating an example of a slot that may be utilized for a synchronization channel with a scaled bandwidth and numerology according to one or more implementations.

Referring now to FIG. 5, a block diagram is shown illustrating an example of a slot that may be utilized for a synchronization channel with a scaled bandwidth and numerology, such as the synchronization channel 304 in FIG. 3, according to one or more implementations. Here, similar to the example in FIG. 4, each of a PSS, an SSS, and a PBCH may be transmitted over the same synchronization bandwidth. This example may be suitable for one or more other communication types, such as mMTC. When transmitting such communication types (e.g., mMTC) with the scaled synchronization channel, it is also contemplated that multiple downlink-centric slots may be utilized to transmit the synchronization channel. For instance, the PSS and the SSS may be sent in different slots. Also, the MRS and PBCH may be multiplexed in frequency as depicted in FIG. 5, and sent in the same slot and over the same antenna ports. For coverage enhancements when transmitting such communication types (e.g., mMTC), the synchronization channel could be repeated over time and similar repetition, where a code cover-based approach can be considered.

Various other aspects for a scalable synchronization channel design are also contemplated. For instance, it is contemplated that a UE may search one or more versions of these scaled synchronization signals (e.g., an mMTC UE may only search one version, whereas an eMBB UE may search for one version in one band and another version in a different band). In some scaled version(s), there may also be different synchronization signal variations to indicate different CPs, different frame structures (e.g., frequency division duplex (FDD), time division duplex (TDD), unlicensed, etc.), etc.

Figure 6:
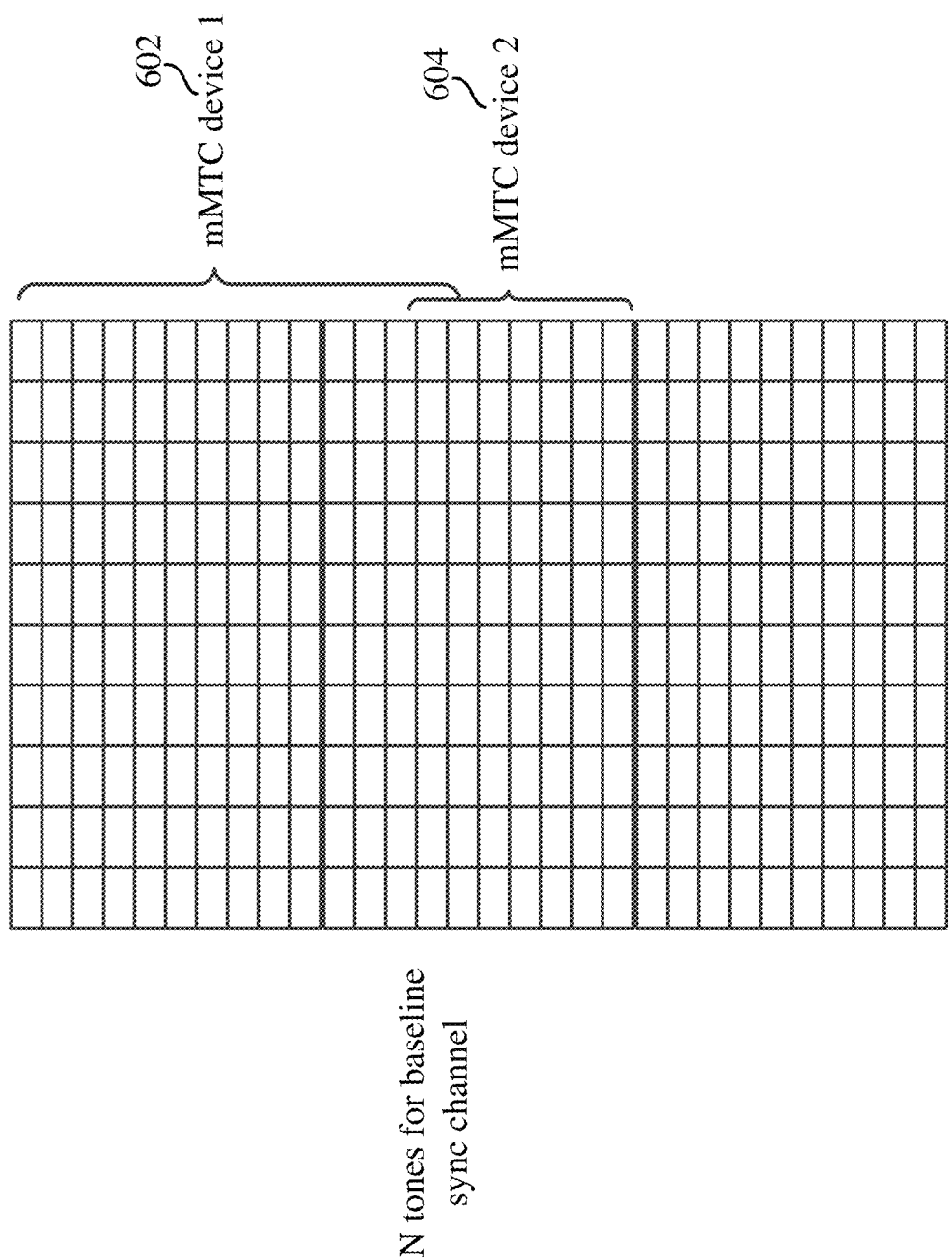
FIG. 6 is a block diagram illustrating an example of a truncated synchronization channel design according to one or more implementations of the present disclosure.

The use of a truncated synchronization channel is also contemplated for one or more implementations of the present disclosure. FIG. 6 is a block diagram illustrating an exemplary truncated synchronization channel design in accordance with an aspect of the disclosure. Within such embodiments, a baseline synchronization channel compatible with a first communication type(s) (e.g., eMBB) may be employed for a first device 602, where synchronization is possible by searching for a truncation of such baseline synchronization channel. A second device 604 utilizing a second communication type(s) (e.g., mMTC) can perform synchronization based on a truncation of the baseline synchronization channel, as illustrated, wherein the truncation size depends on the particular capability of the second device 604.

Figure 7:
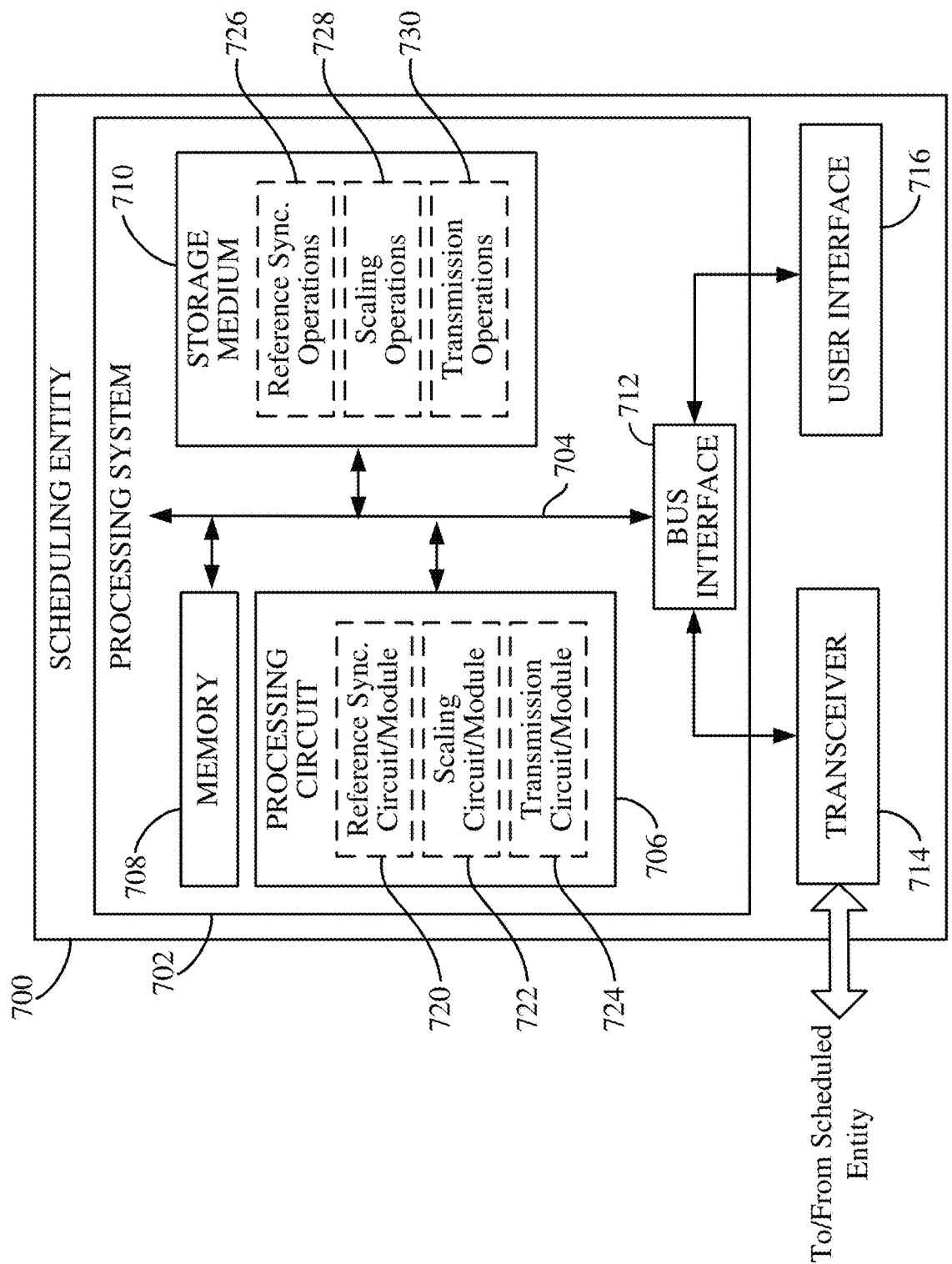
FIG. 7 is a block diagram illustrating an example of a hardware implementation for a scheduling entity employing a processing system.

At least some aspects of the present disclosure include scheduling entities configured to facilitate the various features described herein. FIG. 7 is a block diagram illustrating select components of a scheduling entity 700 employing a processing system 702 according to at least one example of the present disclosure. In this example, the processing system 702 is implemented with a bus architecture, represented generally by the bus 704. The bus 704 may include any number of interconnecting buses and bridges depending on the specific application of the processing system 702 and the overall design constraints. The bus 704 communicatively couples together various circuits including one or more processors (represented generally by the processing circuit 706), a memory 708, and computer-readable media (represented generally by the storage medium 710). The bus 704 may also link various other circuits such as timing sources, peripherals, voltage regulators, and power management circuits, which are well known in the art, and therefore, will not be described any further. A bus interface 712 provides an interface between the bus 704 and a transceiver 714. The transceiver 714 provides a means for communicating with various other apparatus over a transmission medium. Depending upon the nature of the apparatus, a user interface 716 (e.g., keypad, display, speaker, microphone, joystick) may also be provided.

The processing circuit 706 is responsible for managing the bus 704 and general processing, including the execution of programming stored on the computer-readable storage medium 710. The programming, when executed by the processing circuit 706, causes the processing system 702 to perform the various functions described below for any particular apparatus. The computer-readable storage medium 710 and the memory 708 may also be used for storing data that is manipulated by the processing circuit 706 when executing programming. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 706 is arranged to obtain, process and/or send data, control data access and storage, issue commands, and control other desired operations. The processing circuit 706 may include circuitry adapted to implement desired programming provided by appropriate media, and/or circuitry adapted to perform one or more functions described in this disclosure. For example, the processing circuit 706 may be implemented as one or more processors, one or more controllers, and/or other structure configured to execute executable programming and/or execute specific functions. Examples of the processing circuit 706 may include a general purpose processor, a digital signal processor (DSP), an application specific integrated circuit (ASIC), a field programmable gate array (FPGA) and/or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 706 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 706 are for illustration and other suitable configurations within the scope of the present disclosure are also contemplated.

In some instances, the processing circuit 706 may include a reference synchronization circuit and/or module 720, a scaling circuit and/or module 722, and a transmission circuit and/or module 724. The reference synchronization circuit/module 720 may generally include circuitry and/or programming (e.g., programming stored on the storage medium 710) adapted to identify a reference synchronization channel having a reference bandwidth and a reference numerology in which the reference numerology includes a reference subcarrier spacing and a reference cyclic prefix. The scaling circuit/module 722 may generally include circuitry and/or programming (e.g., programming stored on the storage medium 710) adapted to scale the reference synchronization channel according to a type of communication such that the scaling results in a scaled synchronization channel having a scaled bandwidth and a scaled numerology, where the scaled synchronization channel is compatible with the type of communication. The transmission circuit/module 724 may generally include circuitry and/or programming (e.g., programming stored on the storage medium 710) adapted to transmit the scaled synchronization channel. As used herein, reference to circuitry and/or programming may be generally referred to as logic (e.g., logic gates and/or data structure logic).

The storage medium 710 may represent one or more computer-readable devices for storing programming, such as processor executable code or instructions (e.g., software, firmware), electronic data, databases, or other digital information. The storage medium 710 may also be used for storing data that is manipulated by the processing circuit 706 when executing programming. The storage medium 710 may be any available non-transitory media that can be accessed by a general purpose or special purpose processor, including portable or fixed storage devices, optical storage devices, and various other mediums capable of storing, containing and/or carrying programming. By way of example and not limitation, the storage medium 710 may include a non-transitory computer-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 710 may be coupled to the processing circuit 706 such that the processing circuit 706 can read information from, and write information to, the storage medium 710. That is, the storage medium 710 can be coupled to the processing circuit 706 so that the storage medium 710 is at least accessible by the processing circuit 706, including examples where the storage medium 710 is integral to the processing circuit 706 and/or examples where the storage medium 710 is separate from the processing circuit 706 (e.g., resident in the processing system 702, external to the processing system 702, distributed across multiple entities).

Programming stored by the storage medium 710, when executed by the processing circuit 706, can cause the processing circuit 706 to perform one or more of the various functions and/or process steps described herein. In at least some examples, the storage medium 710 may include reference synchronization operations 726, scaling operations 728, and/or transmission operations 730. The reference synchronization operations 726 are generally adapted to cause the processing circuit 706 to identify a reference synchronization channel having a reference bandwidth and a reference numerology in which the reference numerology includes a reference subcarrier spacing and a reference cyclic prefix, as described herein. The scaling operations 728 are generally adapted to cause the processing circuit 706 to scale the reference synchronization channel according to a type of communication such that the scaling results in a scaled synchronization channel include a scaled bandwidth and a scaled numerology, where the scaled synchronization channel is compatible with the type of communication, as described herein. The transmission operations 730 are generally adapted to cause the processing circuit 706 to transmit the scaled synchronization channel, as described herein.

Thus, according to one or more aspects of the present disclosure, the processing circuit 706 is adapted to perform (independently or in conjunction with the storage medium 710) any or all of the processes, functions, steps and/or routines for any or all of the scheduling entities described herein (e.g., base station 110, 112, 114, 118, UE 138, quadcopter 120, scheduling entity 202, scheduling entity 700). As used herein, the term "adapted" in relation to the processing circuit 706 may refer to the processing circuit 706 being one or more of configured, employed, implemented, and/or programmed (in conjunction with the storage medium 710) to perform a particular process, function, step and/or routine according to various features described herein.

Figure 8:
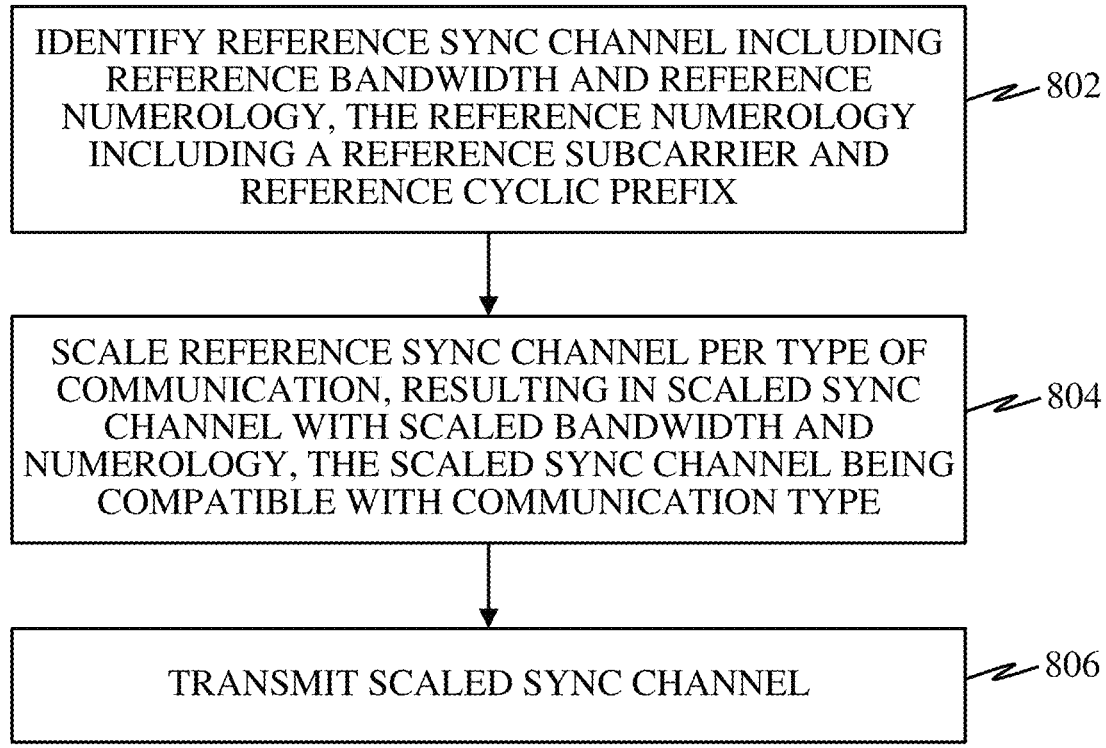
FIG. 8 is a flow diagram illustrating a method operational on a scheduling entity according to at least one example.

FIG. 8 is a flow diagram illustrating at least one example of a method operational on a scheduling entity, such as the scheduling entity 700. Referring to FIGS. 7 and 8, a scheduling entity 700 can identify a reference synchronization channel at 802, where the reference synchronization channel includes a reference bandwidth and a reference numerology with a reference subcarrier spacing and a reference cyclic prefix. For example, the processing system 702 can include logic (e.g., reference synchronization circuit/module 720, reference synchronization operations 726) to identify a reference synchronization channel having a reference bandwidth and a reference numerology in which the reference numerology includes a reference subcarrier spacing and a reference cyclic prefix. In at least one implementation, the reference synchronization channel may be similar to the baseline synchronization channel 302 described previously with reference to FIG. 3. In some implementations, the reference synchronization channel may be compatible with enhanced mobile broadband (eMBB) communications, where a truncation of the reference synchronization channel is also compatible with a massive machine-type communication (mMTC), as described previously with reference to FIG. 6.

At 804, the scheduling entity 700 may scale the reference synchronization channel according to a type of communication, resulting in a scaled synchronization channel including a scaled bandwidth and a scaled numerology. In at least one example, the processing system 702 can include logic (e.g., scaling circuit/module 722, scaling operations 728) to scale the reference synchronization channel according to the communication type, where the scaled synchronization channel includes a scaled bandwidth and a scaled numerology. The scaled synchronization channel will be compatible with the specified type of communication. In at least some implementations, the scaled synchronization channel can facilitate a synchronization signal variation associated with different cyclic prefixes and/or different frame structures. The different frame structures may correspond to a frequency division duplex (FDD) structure, a time division duplex (TDD) structure, and/or an unlicensed structure.

In at least one example, the scheduling entity 700 may be configured to support enhanced mobile broadband (eMBB) communications and/or ultra-reliable low latency communications (URLLC). In such an example, the processing system 702 (e.g., scaling circuit/module 722, scaling operations 728) can scale the reference synchronization channel by an identity scaling factor such that the scaled synchronization channel corresponds to the reference synchronization channel.

In another example, the scheduling entity 700 may be configured to support massive machine-type communication (mMTC). In at least one implementation, the processing system 702 (e.g., scaling circuit/module 722, scaling operations 728) can scale the reference subcarrier spacing down by a scaling factor, and the reference cyclic prefix up by the scaling factor.

In yet another example, the scheduling entity 700 may be configured to support millimeter wave (mmWave) communication. According to such an example, the processing system 702 (e.g., scaling circuit/module 722, scaling operations 728) can scale the reference subcarrier spacing up by a scaling factor, and the reference cyclic prefix down by the scaling factor.

At 806, the scheduling entity 700 may transmit the scaled synchronization channel. For example, the processing system 702 can include logic (e.g., transmission circuit/module 724, transmission operations 730) to transmit the scaled synchronization channel.

In examples where the scheduling entity 700 is configured to support at least one of eMBB communications or URLLC communications, the processing system 702 (e.g., transmission circuit/module 724, transmission operations 730) may further transmit each of a primary synchronization signal (PSS), a secondary synchronization signal (SSS), and a physical broadcast channel (PBCH) over a common synchronization bandwidth, as noted previously with reference to FIG. 4. In some implementations, the processing system 702 (e.g., transmission circuit/module 724, transmission operations 730) may transmit a measurement reference signal (MRS) according to the reference numerology in a bandwidth wider than a scaled synchronization bandwidth, as described previously with reference to FIG. 4. In some implementations, the processing system 702 (e.g., transmission circuit/module 724, transmission operations 730) may be configured to transmit the MRS and PBCH over the same antenna ports of the transceiver 714, and to multiplex the MRS and PBCH in time or frequency, as also noted previously with reference to FIG. 4.

In examples where the scheduling entity 700 is configured to support mMTC the processing system 702 (e.g., transmission circuit/module 724, transmission operations 730) can transmit each of a PSS, an SSS, and a PBCH over a common synchronization bandwidth, as noted previously with reference to FIG. 5. In some implementations, the processing system 702 (e.g., transmission circuit/module 724, transmission operations 730) can transmit PSS and SSS in different slots, as also noted previously with reference to FIG. 5. In some implementations, the processing system 702 (e.g., transmission circuit/module 724, transmission operations 730) can transmit the MRS and PBCH over the same antenna ports in a common slot, and can multiplex the MRS and PBCH in frequency. For mMTC, the processing system 702 (e.g., transmission circuit/module 724, transmission operations 730) can repeat a transmission of the scaled mMTC synchronization channel over time to enhance coverage.

Figure 9:
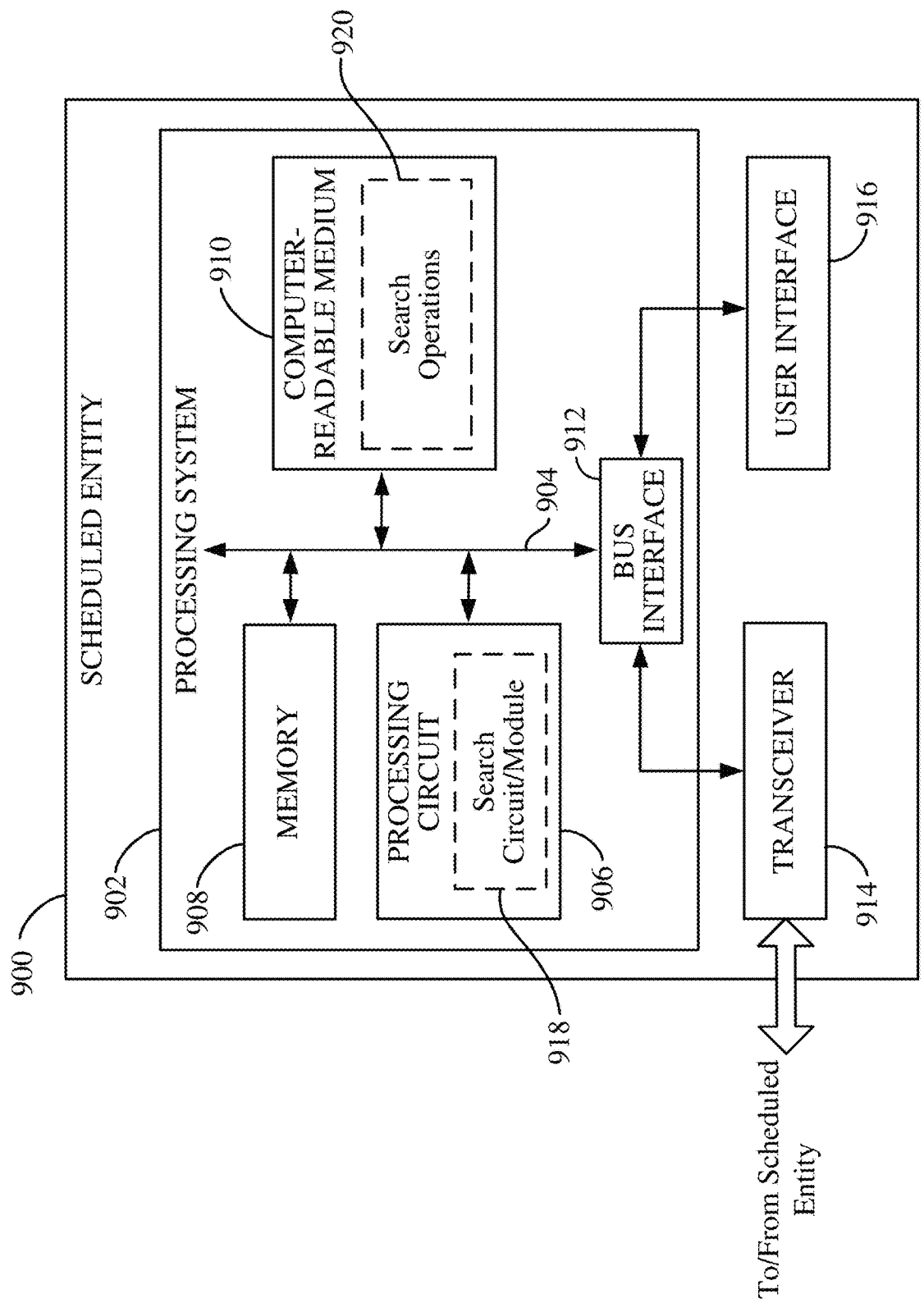
FIG. 9 is a block diagram illustrating an example of a hardware implementation for a scheduled entity employing a processing system.

At least some aspects of the present disclosure include scheduled entities configured to facilitate the various features described herein. FIG. 9 is a block diagram illustrating select components of a scheduled entity 900 employing a processing system 902 according to at least one example of the present disclosure. Similar to the processing system 702 in FIG. 7, the processing system 902 may be implemented with a bus architecture, represented generally by the bus 904. The bus 904 may include any number of interconnecting buses and bridges depending on the specific application of the processing system 902 and the overall design constraints. The bus 904 communicatively couples together various circuits including one or more processors (represented generally by the processing circuit 906), a memory 908, and computer-readable media (represented generally by the storage medium 910). The bus 904 may also link various other circuits such as timing sources, peripherals, voltage regulators, and power management circuits, which are well known in the art, and therefore, will not be described any further. A bus interface 912 provides an interface between the bus 904 and a transceiver 914. The transceiver 914 provides a means for communicating with various other apparatus over a transmission medium. Depending upon the nature of the apparatus, a user interface 916 (e.g., keypad, display, speaker, microphone, joystick) may also be provided.

The processing circuit 906 is responsible for managing the bus 904 and general processing, including the execution of programming stored on the computer-readable storage medium 910. The programming, when executed by the processing circuit 906, causes the processing system 902 to perform the various functions described below for any particular apparatus. The computer-readable storage medium 910 and the memory 908 may also be used for storing data that is manipulated by the processing circuit 906 when executing programming.

The processing circuit 906 is arranged to obtain, process and/or send data, control data access and storage, issue commands, and control other desired operations. The processing circuit 906 may include circuitry adapted to implement desired programming provided by appropriate media in at least one example, and/or circuitry adapted to perform one or more functions described in this disclosure. The processing circuit 906 may be implemented and/or configured according to any of the examples of the processing circuit 706 described previously.

In some instances, the processing circuit 906 may include a search circuit and/or module 920. The search circuit/module 920 may generally include circuitry and/or programming (e.g., programming stored on the storage medium 910) adapted to searching for a scaled synchronization channel according to a type of communication, as described in more detail hereinafter. As noted previously, reference to circuitry and/or programming may be generally referred to as logic (e.g., logic gates and/or data structure logic).

The storage medium 910 may represent one or more computer-readable devices for storing programming, such as processor executable code or instructions (e.g., software, firmware), electronic data, databases, or other digital information. The storage medium 910 may be configured and/or implemented in a manner similar to the storage medium 710 described previously.

Programming stored by the storage medium 910, when executed by the processing circuit 906, can cause the processing circuit 906 to perform one or more of the various functions and/or process steps described herein. In at least some examples, the storage medium 910 may include search operations 920 adapted to cause the processing circuit 906 to search for a scaled synchronization channel according to a type of communication, as described herein. Thus, according to one or more aspects of the present disclosure, the processing circuit 906 is adapted to perform (independently or in conjunction with the storage medium 910) any or all of the processes, functions, steps and/or routines for any or all of the scheduled entities described herein (e.g., UE 122, 124, 126, 128, 130, 132, 134, 136, 138, 140, and 142, scheduled entity 204, scheduled entity 900). As used herein, the term "adapted" in relation to the processing circuit 906 may refer to the processing circuit 906 being one or more of configured, employed, implemented, and/or programmed (in conjunction with the storage medium 910) to perform a particular process, function, step and/or routine according to various features described herein.

Figure 10:
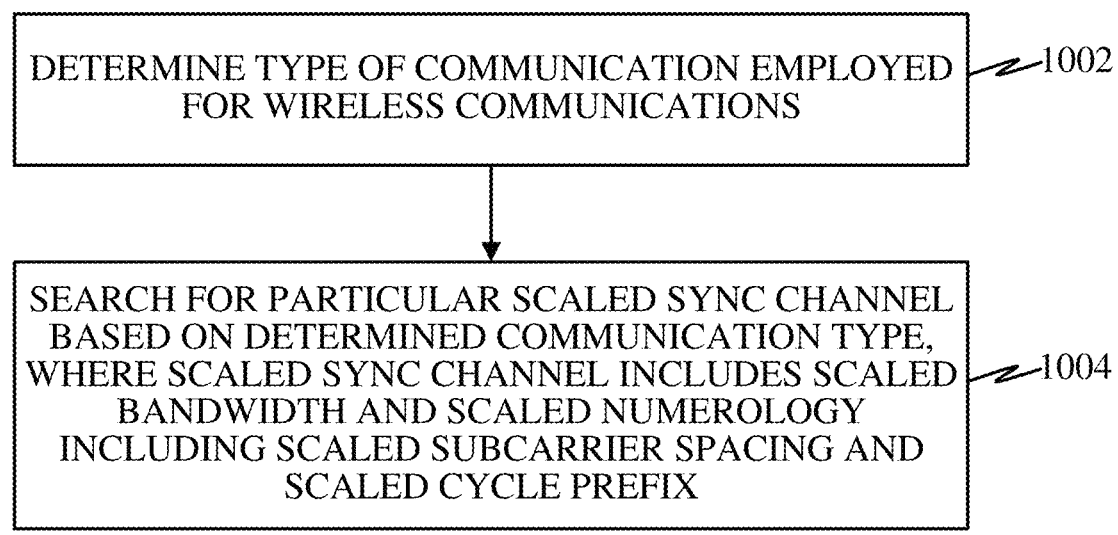
FIG. 10 is a flow diagram illustrating a method operational on a scheduled entity according to at least one example.

FIG. 10 is a flow diagram illustrating at least one example of a method operational on a scheduled entity, such as the scheduled entity 900. Referring to FIGS. 9 and 10, a scheduled entity 900 can determine a type of communication employed for wireless communication. For example, the processing system 902 can include logic (e.g., search circuit/module 918, search operations 920) to determine what communication type is employed by the scheduled entity 900 for wireless communications. In at least one implementation, the communication type may be one of massive machine-type communication (mMTC), millimeter wave (mmWave) communication, enhanced mobile broadband (eMBB) communication, or ultra-reliable low latency communication (URLLC).

At 1004, the scheduled entity 900 can search for a particular scaled synchronization channel based on the determined communication type employed, where the scaled synchronization channel is scaled from a reference synchronization channel and includes a scaled bandwidth and a scaled numerology, and where the scaled numerology includes a scaled subcarrier spacing and a scaled cyclic prefix. For example, the processing system 902 can include logic (e.g., search circuit/module 918, search operations 920) to search for a scaled synchronization channel based on the type of communication employed by the scheduled entity 900.

In at least some implementations, the processing system 902 can include logic (e.g., search circuit/module 918, search operations 920) to search for a truncation of the reference synchronization channel when the type of communication is mMTC, where a size of the truncation varies according to the particular capability of the scheduled entity 900.

In some implementations, the processing system 902 can include logic (e.g., search circuit/module 918, search operations 920) to search for one or more versions of the scaled synchronization channel according to the type of communication. For instance, the processing system 902 can include logic (e.g., search circuit/module 918, search operations 920) to search for a single version of the scaled synchronization channel when the type of communication is mMTC. Additionally, the processing system 902 can include logic (e.g., search circuit/module 918, search operations 920) to search for a first version of the scaled synchronization channel in a first frequency band and second version of the scaled synchronization channel in a second frequency band when the type of communication is eMBB.

In some implementations, after the scaled synchronization channel is received, the processing system 902 (e.g., search circuit/module 918, search operations 920) can determine the cyclic prefix type for the scaled synchronization channel, such as whether the cyclic prefix is a normal cyclic prefix or an extended cyclic prefix. Additionally, the processing system 902 (e.g., search circuit/module 918, search operations 920) can determine a frame structure from the received scaled synchronization channel, such as whether it is FDD, TDD, unlicensed, etc.

While the above discussed aspects, arrangements, and embodiments are discussed with specific details and particularity, one or more of the components, steps, features and/or functions illustrated in FIGS. 1, 2, 3, 4, 5, 6, 7, 8, 9, and/or 10 may be rearranged and/or combined into a single component, step, feature or function or embodied in several components, steps, or functions. Additional elements, components, steps, and/or functions may also be added or not utilized without departing from the present disclosure. The apparatus, devices and/or components illustrated in FIGS. 1, 2, 7, and/or 9 may be configured to perform or employ one or more of the methods, features, parameters, and/or steps described in FIGS. 3, 4, 5, 6, 8, and/or 10. The novel algorithms described herein may also be efficiently implemented in software and/or embedded in hardware.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

While features of the present disclosure may have been discussed relative to certain embodiments and figures, all embodiments of the present disclosure can include one or more of the advantageous features discussed herein. In other words, while one or more embodiments may have been discussed as having certain advantageous features, one or more of such features may also be used in accordance with any of the various embodiments discussed herein. In similar fashion, while exemplary embodiments may have been discussed herein as device, system, or method embodiments, it should be understood that such exemplary embodiments can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. An apparatus for wireless communication, comprising:
a transceiver;
a memory; and
a processing circuit coupled to the transceiver and the memory, the processing circuit adapted to:
identify a reference synchronization channel, the reference synchronization channel including a reference bandwidth and a reference numerology, wherein the reference numerology includes a reference subcarrier spacing and a reference cyclic prefix, and wherein the reference synchronization channel includes a primary synchronization signal (PSS), a secondary synchronization signal (SSS), a physical broadcast channel (PBCH), and one measurement reference signal (MRS), with the PSS, SSS and PBCH located at a common bandwidth, and with the MRS on a bandwidth larger than the common bandwidth;
scale the reference synchronization channel according to a type of communication, the scaling resulting in a scaled synchronization channel including a scaled bandwidth, wherein the scaled synchronization channel is compatible with the type of communication, and wherein the scaled synchronization channel includes the PSS, the SSS, and the PBCH located at a common scaled bandwidth; and
transmit via the transceiver the scaled synchronization channel with the PSS and SSS sent in a first multi-symbol subframe, and the MRS and PBCH multiplexed in time or frequency in a second multi-symbol subframe over one or more common antenna ports.

2. The apparatus of claim 1, wherein the type of communication is a massive machine-type communication (mMTC), and the scaled synchronization channel comprises the reference subcarrier spacing scaled down by a scaling factor and the reference cyclic prefix scaled up by the scaling factor.

3. The apparatus of claim 1, wherein the type of communication is a millimeter wave (mmWave) communication, and wherein the scaled synchronization channel comprises the reference subcarrier spacing scaled up by a scaling factor and the reference cyclic prefix scaled down by the scaling factor.

4. The apparatus of claim 1, wherein the type of communication is at least one of an enhanced mobile broadband (eMBB) communication or an ultra-reliable low latency communication (URLLC), and wherein the scaled synchronization channel comprises the reference synchronization channel scaled by an identity scaling factor such that the scaled synchronization channel is equivalent to the reference synchronization channel.

5. The apparatus of claim 1, wherein the scaled synchronization channel facilitates a synchronization signal variation associated with at least one of different cyclic prefixes or different frame structures.

6. The apparatus of claim 5, wherein the synchronization signal variation is associated with different frame structures, and wherein the different frame structures correspond to at least one of a frequency division duplex (FDD) structure, a time division duplex (TDD) structure, or an unlicensed structure.

7. The apparatus of claim 1, wherein the reference synchronization channel is compatible with an enhanced mobile broadband (eMBB) communication, and wherein a truncation of the reference synchronization channel is compatible with a massive machine-type communication (mMTC).

8. The method of claim 1, wherein the type of communication is a massive machine-type communication (mMTC), and wherein the processing circuit adapted to transmit the scaled synchronization channel comprises the processing circuit adapted to repeat a transmission of the scaled synchronization channel over time.

9. A method of wireless communication comprising:
identifying a reference synchronization channel, the reference synchronization channel including a reference bandwidth and a reference numerology, wherein the reference numerology includes a reference subcarrier spacing and a reference cyclic prefix, and wherein the reference synchronization channel includes a primary synchronization signal (PSS), a secondary synchronization signal (SSS), a physical broadcast channel (PBCH), and one measurement reference signal (MRS), with the PSS, SSS and PBCH located at a common bandwidth, and with the MRS on a bandwidth wider than the common bandwidth;

scaling the reference synchronization channel according to a type of communication, the scaling resulting in a scaled synchronization channel including a scaled bandwidth and a scaled numerology, wherein the scaled synchronization channel is compatible with the type of communication, and wherein the scaled synchronization channel includes the PSS, the SSS, and the PBCH located at a common scaled bandwidth; and transmitting the scaled synchronization channel with the PSS and SSS sent in a first multi-symbol subframe, and the MRS and PBCH multiplexed in time or frequency in a second multi-symbol subframe over one or more common antenna ports.

10. The method of claim 9, wherein the type of communication is a massive machine-type communication (mMTC), and wherein scaling the reference synchronization channel according to the type of communication comprises scaling the reference subcarrier spacing down by a scaling factor and scaling the reference cyclic prefix up by the scaling factor.

11. The method of claim 9, wherein the type of communication is a millimeter wave (mmWave) communication, and wherein scaling the reference synchronization channel according to the type of communication comprises scaling the reference subcarrier spacing up by a scaling factor and scaling the reference cyclic prefix down by the scaling factor.

12. The method of claim 9, wherein the type of communication is at least one of an enhanced mobile broadband (eMBB) communication or an ultra-reliable low latency communication (URLLC), and wherein scaling the reference synchronization channel according to the type of communication comprises scaling the reference synchronization channel by an identity scaling factor such that the scaled synchronization channel is equivalent to the reference synchronization channel.

13. The method of claim 9, wherein the type of communication is one of an enhanced mobile broadband (eMBB) communication or a massive machine-type communication (mMTC).

14. The method of claim 9, wherein the type of communication is an enhanced mobile broadband (eMBB) communication.

15. The method of claim 9, wherein the type of communication is a massive machine-type communication (mMTC), and further comprising transmitting the primary synchronization signal (PSS) and the secondary synchronization signal (SSS) in different slots.

16. The method of claim 9, wherein the type of communication is a massive machine-type communication (mMTC), and further comprising:
multiplexing the measurement reference signal (MRS) and the physical broadcast channel (PBCH) in frequency; and
transmitting the MRS and PBCH in a common slot.

17. An apparatus for wireless communication, comprising:

means for identifying a reference synchronization channel, the reference synchronization channel including a reference bandwidth and a reference numerology, wherein the reference numerology includes a reference subcarrier spacing and a reference cyclic prefix, and wherein the reference synchronization channel includes a primary synchronization signal (PSS), a secondary synchronization signal (SSS), a physical broadcast channel (PBCH), and one measurement reference signal (MRS), with the PSS, SSS and PBCH located at a common bandwidth, and with the MRS on a bandwidth wider than at least a portion of the common bandwidth;

means for scaling the reference synchronization channel based on a communication type, the scaling resulting in a scaled synchronization channel including a scaled bandwidth and a scaled numerology, wherein the scaled synchronization channel is compatible with the communication type, and wherein the scaled synchronization channel includes the PSS, the SSS, and the PBCH located at a common scaled bandwidth; and means for transmitting the scaled synchronization channel with the PSS and SSS sent in a first multi-symbol subframe, and the MRS and PBCH multiplexed in time or frequency in a second multi-symbol subframe transmitted over one or more common antenna ports.

18. The apparatus of claim 17, wherein the communication type is a massive machine-type communication (mMTC), and the scaled synchronization channel comprises the reference subcarrier spacing scaled down by a scaling factor and the reference cyclic prefix scaled up by the scaling factor.

19. The apparatus of claim 17, wherein the communication type is a millimeter wave (mmWave) communication, and wherein the scaled synchronization channel comprises the reference subcarrier spacing scaled up by a scaling factor and the reference cyclic prefix scaled down by the scaling factor.

20. The apparatus of claim 17, wherein the communication type is at least one of an enhanced mobile broadband (eMBB) communication or an ultra-reliable low latency communication (URLLC), and wherein the scaled synchronization channel is equivalent to the reference synchronization channel.

21. The apparatus of claim 17, wherein the scaled synchronization channel facilitates a synchronization signal variation associated with at least one of different cyclic prefixes or different frame structures.

22. The apparatus of claim 21, wherein the synchronization signal variation is associated with different frame structures, and wherein the different frame structures correspond to at least one of a frequency division duplex (FDD) structure, a time division duplex (TDD) structure, or an unlicensed structure.

23. A non-transitory computer-readable storage medium storing processor-executable programming for causing a processing circuit to:
identify a reference synchronization channel, the reference synchronization channel including a reference bandwidth and a reference numerology, wherein the reference numerology includes a reference subcarrier spacing and a reference cyclic prefix, and wherein the reference synchronization channel includes a primary synchronization signal (PSS), a secondary synchronization signal (SSS), a physical broadcast channel (PBCH), and one measurement reference signal (MRS), with the PSS, SSS and PBCH located at a common bandwidth, and with the MRS on a bandwidth larger than at least a portion of the common bandwidth;

scale the reference synchronization channel according to a type of communication, the scaling resulting in a scaled synchronization channel including a scaled bandwidth and a scaled numerology, wherein the scaled synchronization channel is compatible with the type of communication, and wherein the scaled synchronization channel includes the PSS, the SSS, and the PBCH located at a common scaled bandwidth; and transmit the scaled synchronization channel with the PSS and SSS sent in a first multi-symbol subframe, and the MRS and PBCH multiplexed in time or frequency in a second multi-symbol subframe over one or more common antenna ports.

24. The computer-readable storage medium of claim 23, wherein the type of communication is a massive machine-type communication (mMTC), and the scaled synchronization channel comprises the reference subcarrier spacing scaled down by a scaling factor and the reference cyclic prefix scaled up by the scaling factor.

25. The computer-readable storage medium of claim 23, wherein the type of communication is a millimeter wave (mmWave) communication, and wherein the scaled synchronization channel comprises the reference subcarrier spacing scaled up by a scaling factor and the reference cyclic prefix scaled down by the scaling factor.

26. The computer-readable storage medium of claim 23, wherein the type of communication is at least one of an enhanced mobile broadband (eMBB) communication or an ultra-reliable low latency communication (URLLC), and wherein the scaled synchronization channel comprises the reference synchronization channel scaled by an identity scaling factor such that the scaled synchronization channel is equivalent to the reference synchronization channel.

27. The computer-readable storage medium of claim 23, wherein the type of communication is one of an enhanced mobile broadband (eMBB) communication or a massive machine-type communication (mMTC).

28. The computer-readable storage medium of claim 23, wherein the type of communication is an enhanced mobile broadband (eMBB) communication.

29. The computer-readable storage medium of claim 23, wherein the type of communication is a massive machine-type communication (mMTC), and further comprising processor-executable programming for causing the processing circuit to transmit the primary synchronization signal (PSS) and the secondary synchronization signal (SSS) in different slots.

30. The computer-readable storage medium of claim 23, wherein the type of communication is a massive machine-type communication (mMTC), and further comprising processor-executable programming for causing the processing circuit to:

multiplex the measurement reference signal (MRS) and the physical broadcast channel (PBCH) in frequency; and transmit the MRS and PBCH over common antenna ports in a common slot.

* * * * *